(12) United States Patent  
Okumura (10) Patent No.: US 9,063,402 B2  
(45) Date of Patent: Jun. 23, 2015

(54) ILLUMINATING OPTICAL SYSTEM AND PROJECTOR USING THE SAME

(75) Inventor: Fujio Okumura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 204 days.

(21) Appl. No.: 13/580,713

(22) PCT Filed: Mar. 2, 2011

(86) PCT No.: PCT/JP2011/054691  
§ 371 (c)(1),  
(2), (4) Date: Aug. 23, 2012

(87) PCT Pub. No.: WO2011/118345  
PCT Pub. Date: Sep. 29, 2011

(65) Prior Publication Data  
US 2012/0320344 A1    Dec. 20, 2012

(30) Foreign Application Priority Data  
Mar. 26, 2010   (JP) .................................. 2010-072946

(51) Int. Cl.  
*G03B 21/00* (2006.01)  
*G03B 21/20* (2006.01)  
(Continued)

(52) U.S. Cl.  
CPC ............ *G03B 21/204* (2013.01); *G02B 6/0031* (2013.01); *G03B 21/2033* (2013.01); *H04N 9/3197* (2013.01); *H04N 9/3105* (2013.01); *G03B 33/12* (2013.01); *G03B 21/16* (2013.01)

(58) Field of Classification Search  
CPC .... A61B 18/07; A61B 18/22; A61B 18/0017; A61B 18/0653; G02B 6/0031; G03B 21/00; G03B 21/2033; H04N 9/3105; H04N 9/3197  
USPC ........ 353/31, 98, 99, 122; 315/334, 343, 342, 315/341, 344, 147, 145, 197, 260, 267, 315/111.21, 39.51; 348/743–747, E5.137, 348/E9.027; 349/61, 561, 611, 555, 551, 349/84, 231; 362/235, 555, 231, 551, 84  
See application file for complete search history.

(56) References Cited

U.S. PATENT DOCUMENTS 6,164,798 A * 12/2000 Wordin .......................... 362/297  
6,822,404 B2 * 11/2004 Matsumoto et al. .......... 315/334  
(Continued)

FOREIGN PATENT DOCUMENTS

CN    2630900 Y    8/2004  
CN    2896334 Y    5/2007  
(Continued)

OTHER PUBLICATIONS

The international search report for PCT/JP2011/054691 dated Jan. 10, 2012.  
(Continued)

*Primary Examiner* — Sultan Chowdhury  
(74) *Attorney, Agent, or Firm* — Sughrue Mion, PLLC (57) ABSTRACT

An illuminating optical system is realized which can efficiently produce longer-life and higher-luminance illuminating light with a small etendue. The illuminating optical system includes a concave reflection mirror (100), a fluorescent material supporting body (400) that supports fluorescent materials (401 to 403) at the substantially the focal point position of the concave reflection mirror, a plurality of laser light sources (200) that are disposed on the concave reflection mirror at positions perpendicular to the central axis of the concave reflection mirror and that emit excitation light toward the fluorescent materials, and a window (102) covering the open surface of the concave reflection mirror that reflects the excitation light and allows to pass therethrough fluorescence generated when the fluorescent material is irradiated with the excitation light.

19 Claims, 8 Drawing Sheets

(51) Int. Cl.
*F21V 8/00* (2006.01)
*H04N 9/31* (2006.01)
*G03B 33/12* (2006.01)
*G03B 21/16* (2006.01)

(56) References Cited

U.S. PATENT DOCUMENTS

| | | | |
|---|---|---|---|
| 6,953,252 B2* | 10/2005 | Way | 353/99 |
| 7,165,871 B2 | 1/2007 | Takeda et al. | |
| 8,358,069 B2* | 1/2013 | Sumitomo et al. | 313/635 |
| 2003/0133080 A1 | 7/2003 | Ogawa et al. | |
| 2005/0213058 A1* | 9/2005 | Inamoto | 353/122 |
| 2005/0213345 A1 | 9/2005 | Inamoto | |
| 2006/0007410 A1* | 1/2006 | Masuoka et al. | 353/99 |
| 2008/0036973 A1* | 2/2008 | Kojima et al. | 353/38 |
| 2009/0284148 A1 | 11/2009 | Iwanaga | |
| 2011/0176305 A1* | 7/2011 | Schallmoser | 362/235 |
| 2012/0243205 A1* | 9/2012 | Lin | 362/84 |
| 2013/0242232 A1* | 9/2013 | Kimura et al. | 349/70 |

FOREIGN PATENT DOCUMENTS

| | | |
|---|---|---|
| JP | 2003186110 A | 7/2003 |
| JP | 4054594 B | 10/2003 |
| JP | 2004327361 A | 11/2004 |
| JP | 2004354495 A | 12/2004 |
| JP | 2007173177 A | 7/2007 |
| JP | 2008052070 A | 3/2008 |
| JP | 4182804 B2 | 11/2008 |
| JP | 2009277516 A | 11/2009 |

OTHER PUBLICATIONS

Chinese Office Action for CN Application No. 201180016295.6 issued on Jun. 26, 2014 with English Translation.

* cited by examiner

Fig.1

BEAM GUIDE HOLE

Fig.2

LENGTH OF ARROW REPRESENTS INTENSITY OF LIGHT

ILLUMINATING OPTICAL SYSTEM AND PROJECTOR USING THE SAME

TECHNICAL FIELD

The present invention relates to an illuminating optical system that generates illuminating light beams having plurality of colors for forming image light beams having plurality of colors and a projector that projects image light beams emitted from the illuminating optical system.

BACKGROUND ART

Technologies using an LED (light emitting diode) as a light source for a projector that projects an image onto a screen such as a liquid crystal projector and a DMD (digital micromirror device) projector are becoming a focus of attention (see Patent Literature 1).

Since LEDs have long service life and high reliability, projectors using LEDs as their light sources have an advantage of having a long service life and high reliability.

However, on the other hand, the luminance of LED light is low for projectors, and it is therefore not easy to obtain an image with sufficient luminance for projectors using LEDs as their light sources.

The amount of light from a light source available to a display panel as projecting light is limited due to the etendue. That is, it is not possible to efficiently use light from the light source as projecting light unless the value of the product of the light-emission area of the light source and the angle of radiation is set to be equal to or below the value of the product of the area of the plane of incidence of the display panel and the acceptance angle determined by the F number of the illuminating optical system.

For a light source using an LED, the light quantity can be increased by increasing its light-emission area, but when the light-emission area increases, the etendue of the light source also increases. Due to limitations of etendue, it is expected that the LED, as a light source for a projector, will increase the light quantity without increasing the light emission area, but increasing the light quantity without increasing the light emission by a light source that uses an LED is difficult to achieve.

There is a light source apparatus using a laser light source and a fluorescent material described in Patent Literature 2 (Japanese Patent No. 4054594) which recognizes as a problem of the related arts that when an LED is used as a light source of a projector, since the light quantity of the LED is low, a plurality of LEDs need to be used and such LEDs are not suitable for miniaturization of an apparatus.

Figure 1:
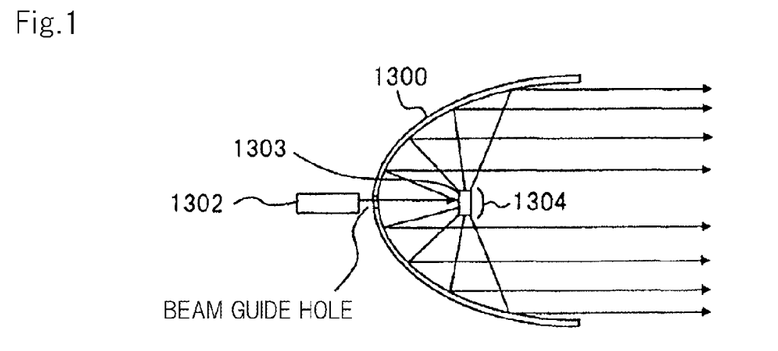
FIG. 1 is a diagram illustrating a schematic configuration of a conventional light source apparatus.

FIG. 1 is a diagram illustrating a schematic configuration of a light source apparatus disclosed in Patent Literature 2.

The light source apparatus includes fluorescent material 1303 disposed at a focal point position of concave reflection mirror 1300, radiates laser light generated by laser light source 1302 onto fluorescent material 1303 through a hole on a central axis of concave reflection mirror 1300 and emits the fluorescence generated as a parallel luminous flux through the concave reflection mirror 1300. A reflection mirror 1304 is provided on the side of anti-laser light source 1302 of fluorescent material 1303 for reflecting laser light that has passed through fluorescent material 1303.

CITATION LIST

Patent Literature

Patent Literature 1: JP2003-186110A
Patent Literature 2: Japanese Patent No. 4054594

SUMMARY OF INVENTION

Technical Problem

When the light source only uses an LED disclosed in Patent Literature 1, the etendue increases.

In the case of the light source apparatus disclosed in Patent Literature 2, it is not possible to efficiently generate parallel fluorescence.

Figure 2:
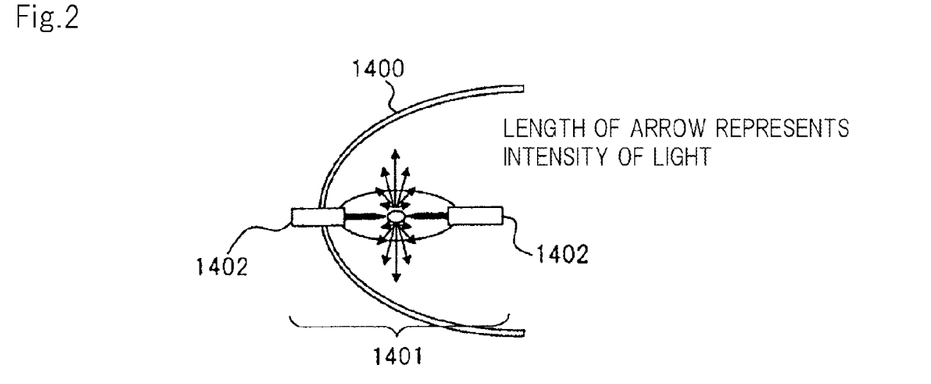
FIG. 2 is a diagram illustrating a combination example of a high-pressure mercury lamp and a concave reflection mirror.

When a case where a high-pressure mercury lamp and a concave reflection mirror are combined is taken as a comparative example, as shown in FIG. 2, lamp 1401, at both ends of which electrodes 1402 are formed, is combined with concave reflection mirror 1400 so that the longitudinal direction of the former matches the central axis of the latter.

In lamp 1401, light is generated between electrodes 1402 and its intensity distribution is as indicated by the arrows in the figure. The length of each arrow is in proportion to the intensity of light, indicating that the greater the length, the stronger the light.

As shown in FIG. 2, in the case of a mercury lamp, most of strong light is generated sideways. Thus, there is no particular problem even when electrodes 1402 are located at the bottom of concave reflection mirror 1400 and parallel illuminating light can be generated efficiently.

Figure 3:
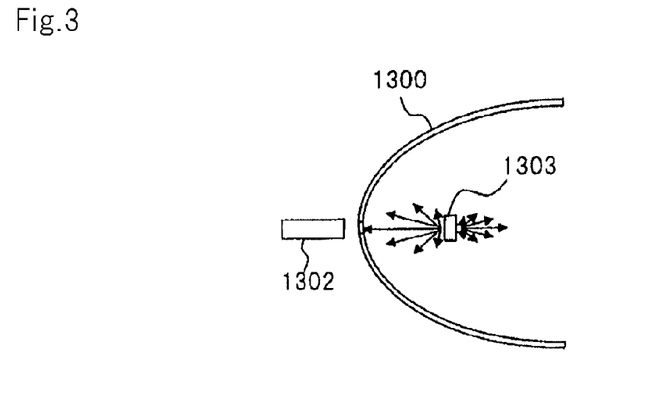
FIG. 3 is a diagram illustrating an intensity distribution of fluorescence generated in the conventional light source apparatus.

FIG. 3 is a diagram illustrating the intensity distribution of fluorescence generated from the light source apparatus disclosed in Patent Literature 1. In FIG. 3, lengths of arrows in the figure are also in proportion to the intensity of light, indicating that the greater the length, the stronger the light.

At positions closer to the surface of fluorescent material 1303, more laser light is absorbed, and therefore fluorescence on the side of the plane of incidence which is the side of laser light source 1302 is stronger than fluorescence emitted toward the light-emerging side (right side in the figure). The fluorescence going out toward laser light source 1302 is again returned to fluorescent material 1303 even when it is reflected by concave reflection mirror 1300, weakened as it passes through fluorescent material 1303 and it is thereby impossible to efficiently generate illuminating light.

It is an object of the present invention to realize an illuminating optical system having small etendue and capable of efficiently generating long-life and high-luminance illuminating light.

Solution to Problem

An illuminating optical system according to the present invention includes:
a concave reflection mirror;
a fluorescent material supporting body that supports a fluorescent material at a substantially the focal position of the concave reflection mirror;
a plurality of laser light sources disposed on the concave reflection mirror at positions perpendicular to a central axis of the concave reflection mirror that emit excitation light toward the fluorescent material; and
a window covering an opening of the concave reflection mirror that reflects the excitation light and allows to pass therethrough fluorescence generated through irradiation of the excitation light. Furthermore, a projector according to the present invention is provided with the above-described illuminating optical system.

Advantageous Effects of Invention

According to the present invention, a laser having high energy density is condensed to a fluorescent material as excitation light and fluorescence emitted from the condensing location is used. Since the plurality of laser light sources that emit excitation light toward the fluorescent material are disposed on the concave reflection mirror at positions perpendicular to the central axis of the concave reflection mirror, strong fluorescence is generated toward the side of the concave reflection mirror. Thus, it is possible to realize an illuminating optical system having small etendue, long life and high luminance.

BRIEF DESCRIPTION OF DRAWINGS

[FIG. 1]

[FIG. 2]

[FIG. 3]

[FIG. 4]

[FIG. 5]

[FIG. 6] FIGS. 6(a) and (b) are a block diagram illustrating a configuration of an optical system according to another exemplary embodiment of a projector using the optical system shown in FIG. 4.

[FIG. 7]

[FIG. 8] FIG. 8 is a diagram illustrating a schematic configuration according to a still further exemplary embodiment of an illuminating optical system according to the present invention; FIG. 8(a) showing a rear view and FIG. 8(b) showing a side view.

[FIG. 9]

[FIG. 10]

[FIG. 11]

[FIG. 12]

DESCRIPTION OF EMBODIMENTS

Next, exemplary embodiment of the present invention will be described with reference to the accompanying drawings.

Figure 4:
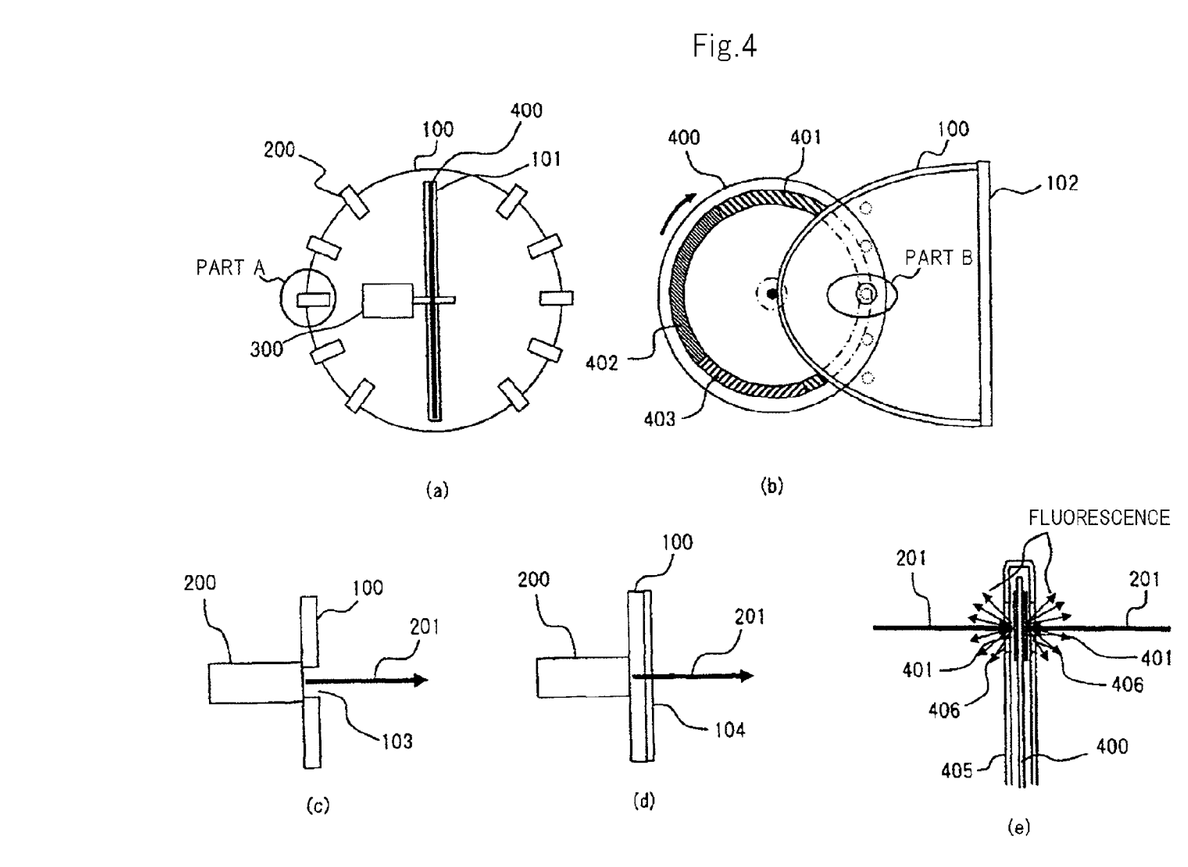
FIG. 4 is a block diagram illustrating a configuration of an exemplary embodiment of an illuminating optical system according to the present invention; (a) showing a rear view, (b) showing a side view, (c) and (d) showing partial side views illustrating an example of part A in (a), and (e) showing a partial top view illustrating details of the configuration of part B in (b).

FIG. 4 is a block diagram illustrating a configuration of an exemplary embodiment of an illuminating optical system according to the present invention, FIG. 4(a) showing a rear view, FIG. 4(b) showing a side view, FIG. 4(c) and FIG. 4(d) showing partial side views illustrating an example of part A in FIG. 4(a), and FIG. 4(e) showing a partial top view illustrating details of the configuration of part B in FIG. 4(b).

As shown in FIGS. 4(a) and (b), the present exemplary embodiment is provided with concave reflection mirror 100, laser light source 200, motor 300 and fluorescent material wheel 400.

Elongated opening 101 is formed in concave reflection mirror 100. Fluorescent material wheel 400 is disposed so that part thereof enters concave reflection mirror 100 from opening 101.

Fluorescent material wheel 400 is rotated by motor 300 disposed outside concave reflection mirror 100 and arranged so as to pass through a substantially the focal point position of concave reflection mirror 100. A fluorescent material supporting region for supporting a fluorescent material is disposed around the periphery of the position corresponding to the substantially the focal point position of concave reflection mirror 100.

As shown in FIG. 4(b), green color fluorescent material 401, red color fluorescent material 402 and blue color fluorescent material 403 are disposed in the fluorescent material supporting region.

A plurality of laser light sources 200 that emit laser light toward the focal point position are disposed on concave reflection mirror 100. According to the present exemplary embodiment, each laser light source 200 is disposed so as to be perpendicular to the central axis of concave reflection mirror 100. Furthermore, window 102 is formed on the fluorescence emerging surface (right side in FIG. 4(b)) which reflects laser light from each laser light source 200 and allows to pass therethrough fluorescence generated when the laser light is radiated onto the fluorescent material supporting region.

Each of blue color fluorescent material 403, green color fluorescent material 401 and red color fluorescent material 402 is excited by laser light radiated from laser light source 200 to generate blue, green and red fluorescence respectively. In the present exemplary embodiment, when a wavelength of the laser light generated by laser light source 200 is assumed to be λ1, and central wavelengths of fluorescence generated by blue color fluorescent material 403, green color fluorescent material 401 and red color fluorescent material 402 are assumed to be λ2, λ3, λ4, there is a relationship of λ1<λ2<λ3<λ4.

Examples of the method of attaching laser light source 200 to concave reflection mirror 100 include methods shown in FIG. 4(c) and FIG. 4(d).

According to the method shown in FIG. 4(c), laser light source 200 is attached such that excitation light 201 generated by laser light source 200 enters concave reflection mirror 100 through hole 103 disposed in concave reflection mirror 100.

According to the example shown in FIG. 4(d), fluorescence reflection layer 104 is disposed in concave reflection mirror 100. In this case, concave reflection mirror 100 is formed of a material transparent to excitation light 201, and fluorescence reflection layer 104 is formed of a material that allows excitation light 201 to pass therethrough and reflects fluorescence generated by each fluorescent material.

FIG. 4(e) is a top view illustrating a configuration in the vicinity of a focal point position of concave reflection mirror 100.

Case 405 that covers fluorescent material wheel 400 is disposed in concave reflection mirror 100. As described above, any one of green color fluorescent material 401, red color fluorescent material 402 and blue color fluorescent material 403 is disposed in the fluorescent material supporting region of fluorescent material wheel 400 and these materials are formed on both sides of fluorescent material wheel 400 as shown in the figure (in FIG. 4[e], green color fluorescent material 401), and two windows 406 are formed in case 405 at the substantially the focal point position of concave reflection mirror 100 so as to allow excitation light 201 to be radiated onto the fluorescent material supporting regions formed on both sides of fluorescent material wheel 400.

According to the present exemplary embodiment configured as shown above, the fluorescent material supporting regions formed on both sides of fluorescent material wheel 400 are irradiated with excitation light 201 from the plurality of laser light sources 200 to generate fluorescence.

Since each laser light source 200 is disposed so as to be perpendicular to the central axis of concave reflection mirror 100, the fluorescence generated is directed in a direction perpendicular to the central axis of concave reflection mirror 100 and it is thereby possible to efficiently generate parallel illuminating light.

Fluorescent material wheel 400 rotates in accordance with the rotation of motor 300, green color fluorescence, red color fluorescence and blue color fluorescence are sequentially outputted from window 102 as illuminating light. Since window 102 is made of a material that reflects excitation light 201, excitation light 201 which is laser light is never outputted to the outside.

In the case shown in FIG. 4(d) where excitation light 201 is radiated onto fluorescent material wheel 400 through fluorescence reflection layer 104, all the fluorescence that is generated is outputted through window 102, which prevents fluorescence from impinging on laser light source 200 and which prevents the occurrence of loss, and can thereby improve efficiency.

The provision of windows 406 shown in FIG. 4(e) causes the region where fluorescence is generated to be limited to the locations where windows 406 are disposed. The fluorescence that is generated is reflected inside concave reflection mirror 100, but since the region where fluorescence is generated is limited to the locations where windows 406 are disposed, fluorescence having a color other than colors outputted as illuminating light is never generated and illuminating light that has high colorimetric purity can be formed.

Furthermore, a light-emitting region is determined by window 406. For this reason, the apparent size of the light source is determined by the size of window 406, and it is thereby possible to reduce the apparent size of the light source and reduce the etendue.

Since fluorescence is generated from the fluorescent material disposed on both sides of fluorescent material wheel 400, there are two locations where the fluorescent material is generated. Compared to a configuration with one location where the fluorescent material is generated, twice as much brightness can be obtained if other conditions are assumed to be the same.

In the configuration disclosed in Patent Literature 2, excitation light is consecutively radiated onto the same location of the fluorescent material, whereas the present exemplary embodiment has a configuration in which the fluorescent material moves, and therefore excitation light is never consecutively radiated onto the same location where the fluorescent material is disposed.

Irradiation of excitation light causes the fluorescent material to be heated, but the configuration disclosed in Patent Literature 2 in which irradiation is performed consecutively has no cooling period, which results in the fluorescent material being kept at a high temperature.

In the configuration of the present exemplary embodiment in which excitation light is never consecutively radiated onto the same region of the fluorescent material, a cooling period is provided and the fluorescent material is therefore kept at a lower temperature than the case where irradiation is performed consecutively, resulting in the fluorescent material having a longer life.

Figure 5:
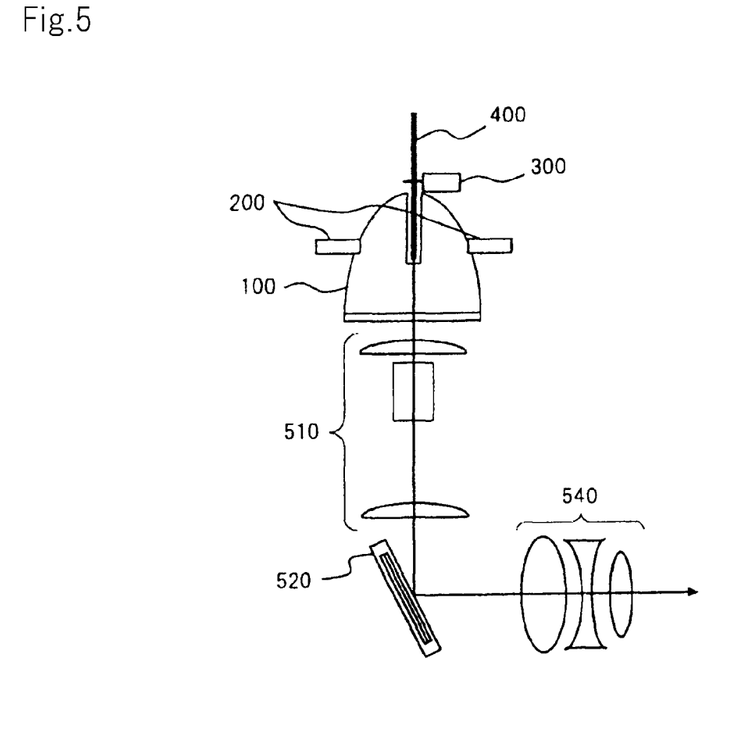
FIG. 5 is a block diagram illustrating the configuration of an optical system according to an exemplary embodiment of a projector using the illuminating optical system shown in FIG. 4.

FIG. 5 is a block diagram illustrating a configuration of an optical system according to an exemplary embodiment of a projector using the illuminating optical system shown in FIG. 4.

Green color fluorescence, red color fluorescence and blue color fluorescence sequentially outputted from concave reflection mirror 100 illuminate DMD 520 via integrator 500. DMD 520 reflects image light corresponding to illuminating light toward projection lens 540. As a result, image light beams of the respective colors are sequentially projected from projection lens 540.

Figure 6:
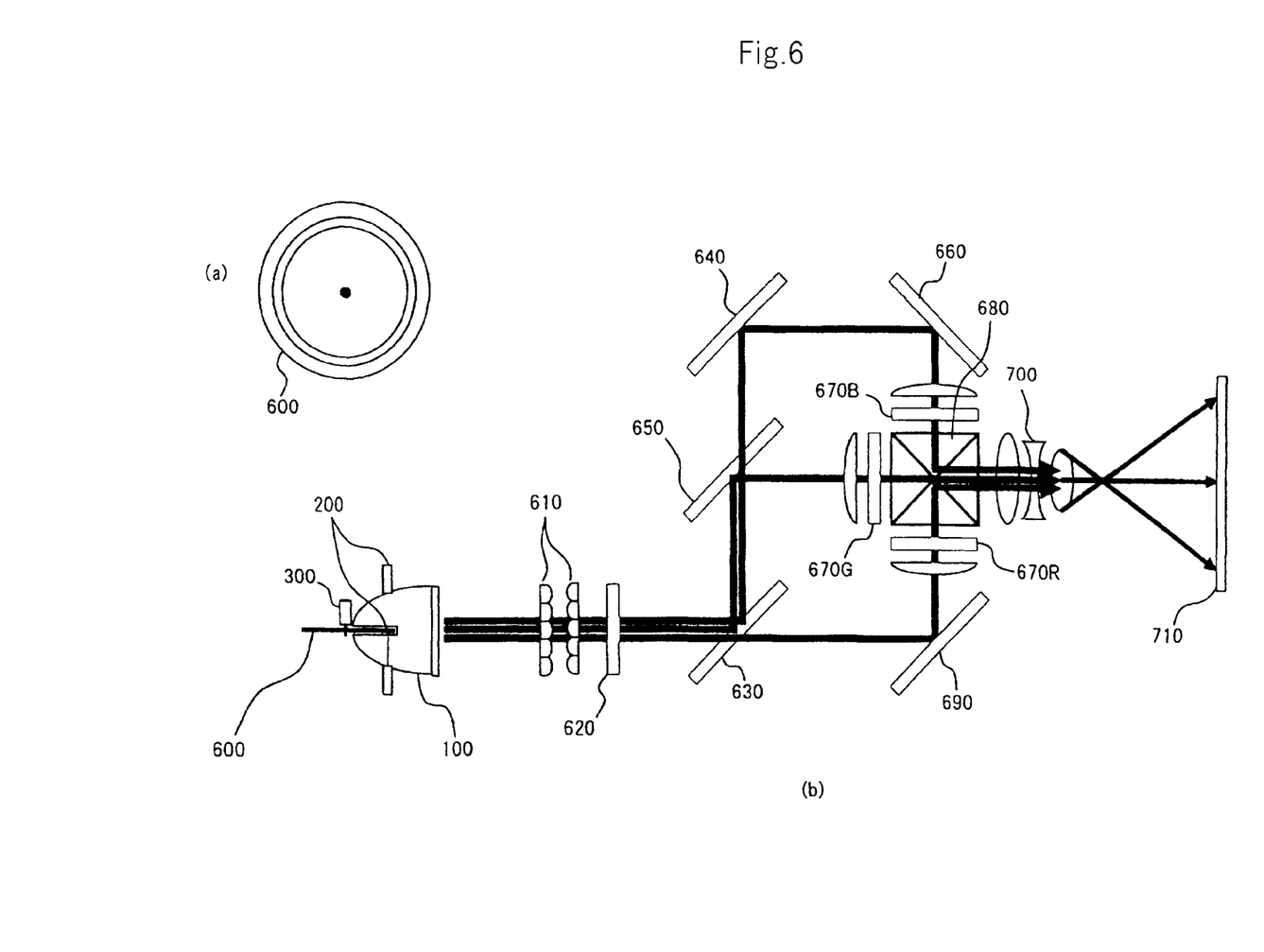

FIG. 6 is a block diagram illustrating the configuration of an optical system according to another exemplary embodiment of a projector using the illuminating optical system shown in FIG. 4.

The present exemplary embodiment uses white color fluorescent material wheel 600 that generates white color fluorescence shown in FIG. 6(a) as the fluorescent material wheel.

Since the present exemplary embodiment uses white color fluorescent material wheel 600, a white color illuminating light is outputted from concave reflection mirror 100. The illuminating light is separated by a color separation optical system into red color light, green color light and blue color light to illuminate a plurality of liquid crystal light valves forming images of the respective colors. The image light beams that have passed through the respective liquid crystal light valves are synthesized by a synthesis prism and projected onto a screen via a projection lens. The configuration of the present exemplary embodiment will be described more specifically below.

The white color illuminating light outputted from concave reflection mirror 100 passes through integrator 610 and polarization conversion element 620 and is thereby transformed into uniform linearly polarized light and impinges on dichroic mirror 630.

Dichroic mirror 630 is intended to allow only red color light to pass therethrough and the red color light that has passed through dichroic mirror 630 is reflected by mirror 690 and illuminates liquid crystal light valve 670R that forms an image for red color light.

The light reflected by dichroic mirror 630 impinges on dichroic mirror 650. Dichroic mirror 650 is intended to reflect only green color light and the green color light reflected by dichroic mirror 650 illuminates liquid crystal light valve 670G that forms an image for green color light.

The blue color light that has passed through dichroic mirror 650 is reflected by mirrors 640 and 660 and illuminates liquid crystal light valve 670B that forms an image for blue color light.

Image light beams of the respective colors that have passed through light valves 670R, 670G and 670B are synthesized by synthesis prism 680 and projected onto screen 710 via projection lens 700.

Figure 7:
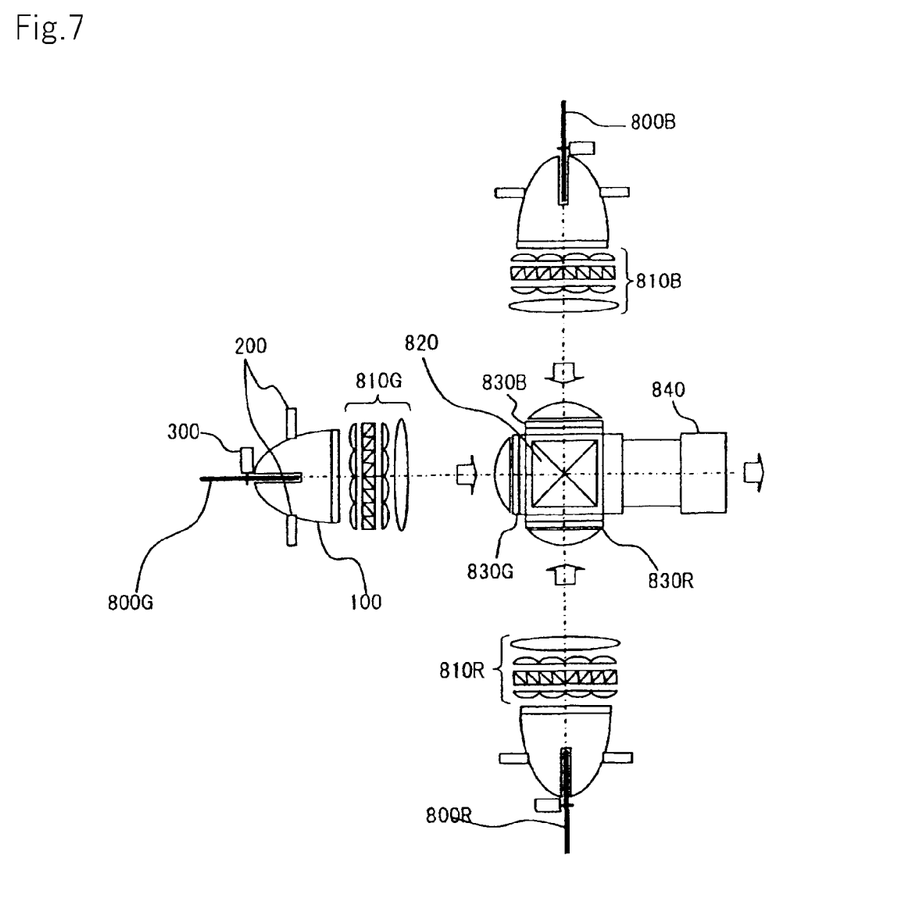
FIG. 7 is a block diagram illustrating a configuration of an optical system according to a further exemplary embodiment of a projector using the illuminating optical system shown in FIG. 4.

FIG. 7 is a block diagram illustrating a configuration of an optical system according to a further exemplary embodiment of a projector using the optical system shown in FIG. 4.

The present exemplary embodiment provides the illuminating optical system shown in FIG. 4 for red, green and blue colors respectively.

The respective illuminating optical system for red, green and blue colors are provided with red color fluorescent material wheel 800R, green color fluorescent material wheel 800G and blue color fluorescent material wheel 800B that generate fluorescence of red, green and blue colors respectively as fluorescent material wheels.

The illuminating light beams of red, green and blue colors generated in the respective illuminating optical systems are transformed into uniform linearly polarized light via dimming lens groups 810R, 810G and 810B and illuminate liquid crystal light valves 830R, 830G and 830B respectively.

Liquid crystal light valves 830R, 830G and 830B are intended to form images for red, green and blue color light respectively and the image light beams of the respective colors that have passed through liquid crystal light valves 830R, 830G and 830B are synthesized by dichroic prism 820 and projected via projection lens 840.

Figure 8:
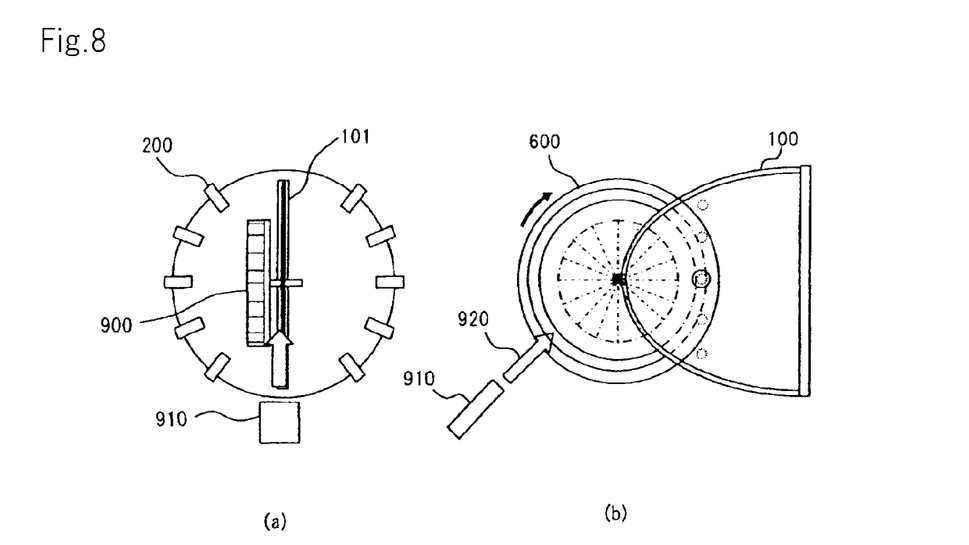

FIG. 8 is a diagram illustrating a schematic configuration according to a still further exemplary embodiment of an optical system according to the present invention; FIG. 8(a) showing a rear view and FIG. 8(b) showing a side view.

The present exemplary embodiment is applied to an illuminating optical system that generates a single-color illuminating light as shown in FIG. 6 and FIG. 7.

When a projector is configured using the illuminating optical system shown in FIG. 4 and FIG. 5 that sequentially outputs illuminating light beams of different colors, images formed in an image forming element such as a DMD or liquid crystal light valve need to be synchronized with output light, and therefore the rotation state of the fluorescent material wheel needs to be controlled.

In the illuminating optical system that generates single-color illuminating light as shown in FIG. 6 and FIG. 7, the image forming element and the rotation state of the fluorescent material wheel need not be synchronized with each other.

The present exemplary embodiment provides pinwheel 900 having the same axis of rotation as that of fluorescent material wheel 600 instead of motor 300 shown in FIG. 4 so that pinwheel 900 and fluorescent material wheel 600 are rotated through air flow 920 from fan 910. Air flow 920 also enters case 405 (see FIG. 4(e)) from opening 101 and cools fluorescent material wheel 600.

Figure 9:
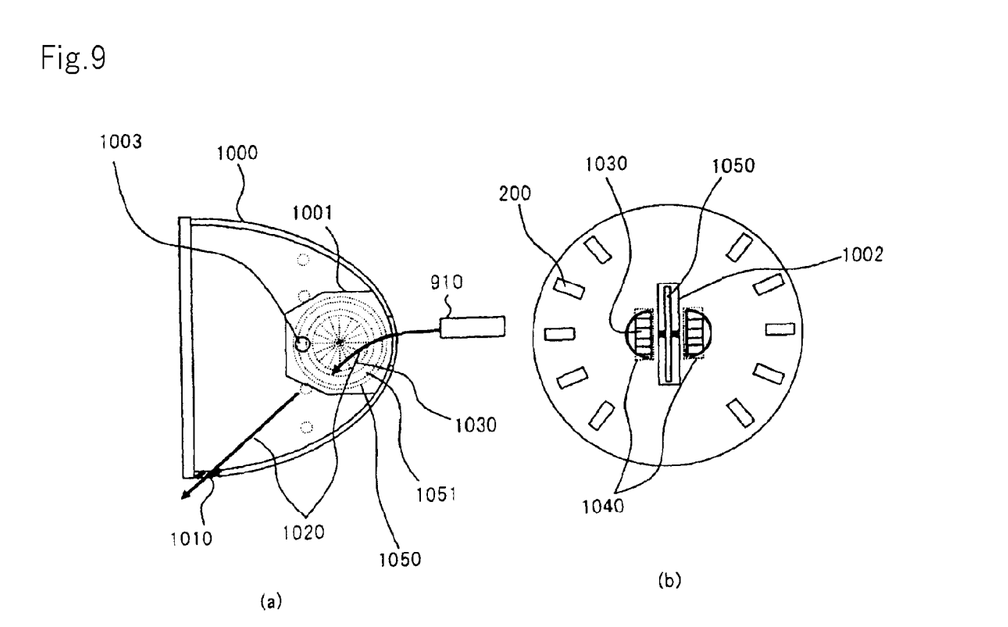
FIG. 9 is a diagram illustrating a schematic configuration of a still further exemplary embodiment of an illuminating optical system according to the present invention; (a) showing a side view and (b) showing a rear view.

FIG. 9 is a diagram illustrating a schematic configuration according to a still further exemplary embodiment of an illuminating optical system according to the present invention, FIG. 9(a) showing a side view and FIG. 9(b) showing a rear view.

In the exemplary embodiment shown in FIG. 8, pinwheel 900 is provided outside concave reflection mirror 100, whereas in the present exemplary embodiment, small-sized fluorescent material wheel 1050 and pinwheel 1030 are provided inside concave reflection mirror 1000.

Fluorescent material wheel 1050 and pinwheel 1030 rotate around the same axis of rotation and two pinwheels 1030 are provided on both sides of fluorescent material wheel 1050.

Fluorescent material wheel 1050 is accommodated in case 1001 disposed inside concave reflection mirror 1000. Fluorescent materials 1051 that pass through the substantially the focal point position of concave reflection mirror 1000 are disposed around the periphery on both sides of fluorescent material wheel 1050 and excitation light beams from a plurality of laser light sources disposed at positions perpendicular to the central axis of concave reflection mirror 100 are radiated onto fluorescent material 1051 via window 1003 disposed in case 1001.

Pinwheel 1030 is disposed inside concave reflection mirror 1000. Exhaust port 1010 is formed at an end of the emerging surface of concave reflection mirror 1000 and air flow 1020 generated by fan 910 enters concave reflection mirror 1000 from vent 1040 disposed at the rear of concave reflection mirror 1000, rotates pinwheel 1030 and is exhausted from exhaust port 1010.

Figure 10:
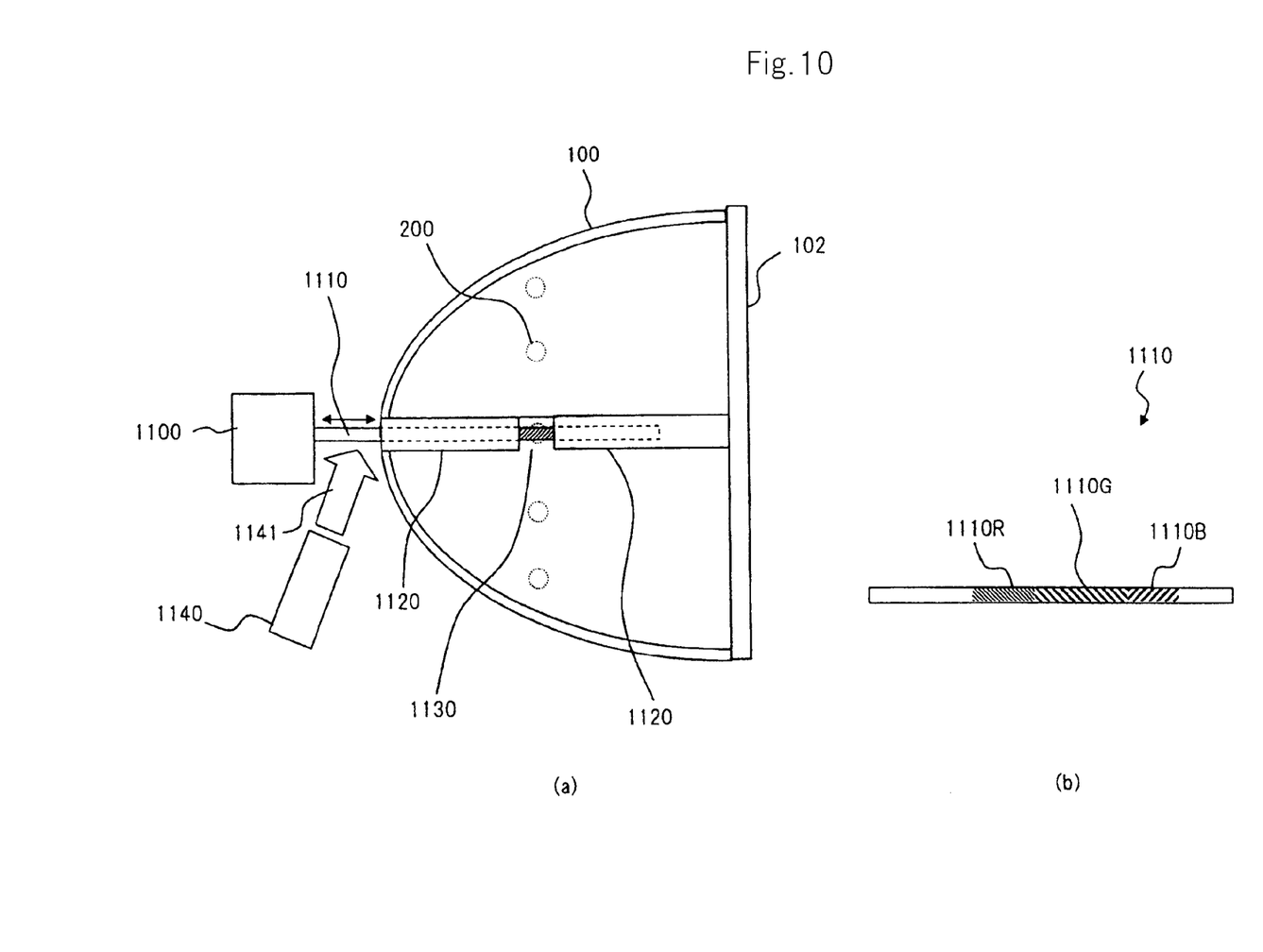
FIG. 10 is a diagram illustrating a schematic configuration of a still further exemplary embodiment of an illuminating optical system according to the present invention; (a) showing a side view and (b) showing details of a configuration of fluorescent bar 1110 in (a).

FIG. 10 is a diagram illustrating a schematic configuration according to a still further exemplary embodiment of an illuminating optical system according to the present invention, FIG. 10(a) showing a side view and FIG. 10(b) showing details of a configuration of fluorescent bar 1110 in FIG. 10(a).

The present exemplary embodiment uses fluorescent bar 1110 to both sides of which red color fluorescent material 1110R, green color fluorescent material 1110G and blue color fluorescent material 1110B are applied as shown in FIG. 10(b) instead of fluorescent material wheel 400 used in the illuminating optical system shown in FIG. 4.

Fluorescent bar 1110 is accommodated in case 1120 that is disposed in concave reflection mirror 100 in a manner such that fluorescent bar 1110 movably passes through substantially the focal point position of concave reflection mirror 100.

The end of fluorescent bar 1110 protrudes from the rear of concave reflection mirror 100 and is connected to reciprocation drive mechanism 1100, and performs reciprocating motion by reciprocation drive mechanism 1100 that passes through the substantially the focal point position of concave reflection mirror 100.

Slit 1130 is formed at a location of case 1120 corresponding to the substantially the focal point position of concave reflection mirror 100 from which any one of red color fluorescent material 1110R, green color fluorescent material 1110G and blue color fluorescent material 1110B is exposed accompanying the reciprocating motion of fluorescent bar 1110.

In the present exemplary embodiment as in the case of the exemplary embodiment shown in FIG. 4, the fluorescent material formed on both sides of fluorescent bar 1110 is irradiated with excitation light 201 from a plurality of laser light sources 200 to generate fluorescence.

Since laser light sources 200 are arranged so as to be perpendicular to the central axis of concave reflection mirror 100, the fluorescence generated is directed in a direction perpendicular to the central axis of concave reflection mirror 100, and is thus capable of efficiently generating parallel illuminating light.

Reciprocation drive mechanism 1100 causes fluorescent bar 1110 to perform reciprocating motion and green color fluorescence, red color fluorescence and blue color fluorescence are sequentially outputted from window 102 as illuminating light. Since window 102 is made of a material that reflects excitation light 201, excitation light 201 which is laser light is never outputted to the outside.

Air flow 1141 is blown over fluorescent bar 1110 connected to reciprocation drive mechanism 1100 by fan 1140 so as to cool fluorescent bar 1110.

The configuration of the projector using the present exemplary embodiment is similar to the one shown in FIG. 5. Furthermore, when fluorescent bar 1110 uses a fluorescent material that generates white color or single color illuminating light as shown in FIG. 6 or FIG. 7, it is possible to configure the projector as shown in FIG. 6 and FIG. 7.

Figure 11:
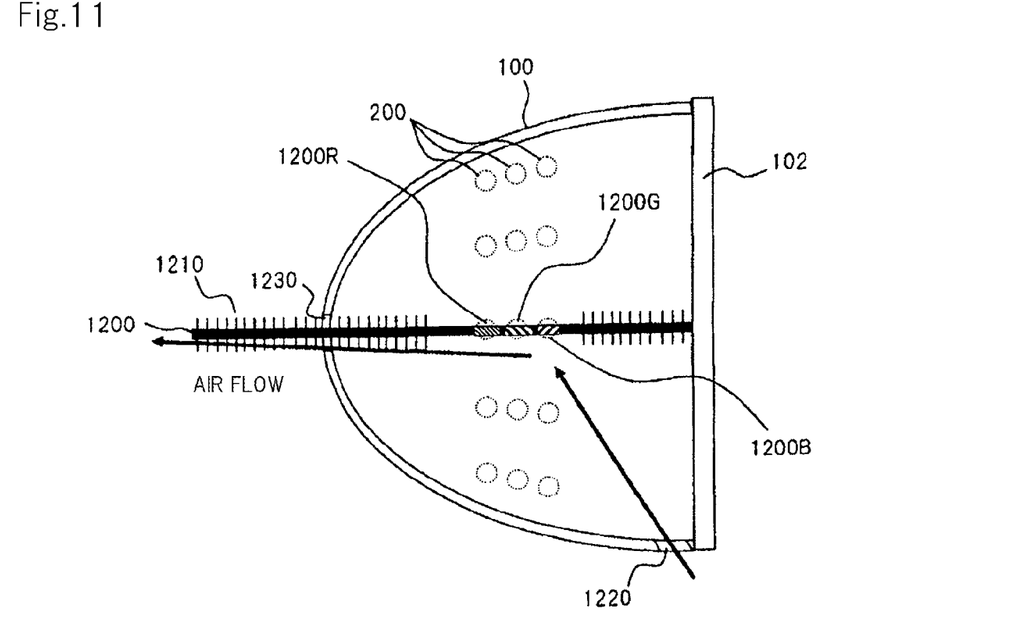
FIG. 11 is a side view illustrating a schematic configuration of a still further exemplary embodiment of an illuminating optical system according to the present invention.

FIG. 11 is a side view illustrating a schematic configuration according to a still further exemplary embodiment of an illuminating optical system according to the present invention.

The present exemplary embodiment provides fluorescent bar 1200 that passes through the substantially the focal point position of concave reflection mirror 100. Red color fluorescent material 1200R, green color fluorescent material 1200G and blue color fluorescent material 1200B are formed on both sides of fluorescent bar 1200 at the position corresponding to the substantially the focal point position of concave reflection mirror 100.

A plurality of laser light sources 200 are disposed in the form of an array in correspondence with red color fluorescent material 1200R, green color fluorescent material 1200G and blue color fluorescent material 1200B and are also provided so as to be perpendicular to the central axis of concave reflection mirror 100.

In the case of the present exemplary embodiment, illuminating light can be controlled by selecting laser light source 200 that radiates excitation light onto the fluorescent material. When red color illuminating light is necessary, only laser light source 200 that radiates excitation light onto red color fluorescent material 1200R may be operated. Thus, the projector shown in FIG. 5 can be configured by sequentially changing illuminating light.

Furthermore, when white color light is necessary, excitation light may be radiated onto all red color fluorescent material 1200R, green color fluorescent material 1200G and blue color fluorescent material 1200B. The projector shown in FIG. 6 can be configured by adopting such a white color light source.

Furthermore, any one of red color fluorescent material 1200R, green color fluorescent material 1200G and blue color fluorescent material 1200B may be used as the fluorescent material, and in this case the projector shown in FIG. 7 can be configured.

In the case of the present exemplary embodiment, since the region to be irradiated onto the fluorescent material does not move, a heat radiating mechanism is provided. Vent 1220 is disposed at an end of the emerging surface of concave reflection mirror 100 and exhaust port 1230 is disposed at the center of the rear of concave reflection mirror 100. Furthermore, a plurality of radiator fins 1210 are formed on fluorescent bar 1200, and fluorescent bar 1200 is cooled by an air flow that is introduced from vent 1220 and exhausted from exhaust port 1230.

Figure 12:
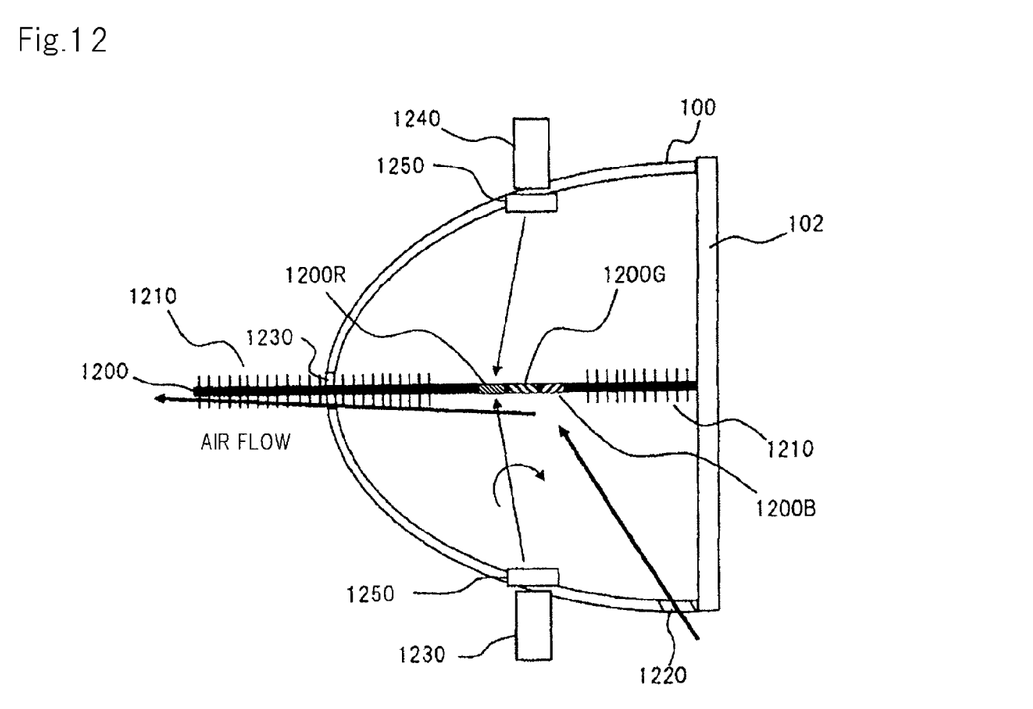
FIG. 12 is a side view illustrating a schematic configuration of a still further exemplary embodiment of an illuminating optical system according to the present invention.

FIG. 12 is a side view illustrating a schematic configuration of a still further exemplary embodiment of an illuminating optical system according to the present invention.

The present exemplary embodiment integrates laser light sources 200 disposed for red color fluorescent material 1200R, green color fluorescent material 1200G and blue color fluorescent material 1200B respectively in the exemplary embodiment shown in FIG. 11 with one laser light source 1240 and provides scanning system 1250 that changes the orientation of excitation light outputted from laser light source 1240.

Specific examples of scanning system 1250 include an acoustic optical element whose refractive index is modulated in an analog fashion when a voltage is applied thereto, so as to change the laser light traveling direction or a mirror combined with a drive mechanism or the like.

The present exemplary embodiment can also configure the projector shown in FIG. 5 to FIG. 7 according to the configuration of the fluorescent material in the same way as in the exemplary embodiment shown in FIG. 11.

The present application claims a priority based on JP2010-072946A, filed on Mar. 26, 2010, the disclosure of which is incorporated herein by reference in its entirety.

REFERENCE SIGNS LIST

100 Concave reflection mirror
200 Laser light source
300 Motor
400 Fluorescent material wheel

The invention claimed is::

1. An illuminating optical system comprising:
   a concave reflection mirror;
   a fluorescent material supporting body that supports a fluorescent material at a substantially the focal point position of said concave reflection mirror;
   a plurality of laser light sources disposed on said concave reflection mirror at positions perpendicular to a central axis of said concave reflection mirror that emit excitation light toward the fluorescent material; and
   a window covering having an opening of said concave reflection mirror that reflects the excitation light and allows to pass therethrough fluorescence generated through irradiation of the excitation light.

2. The illuminating optical system according to claim 1, wherein said fluorescence supporting body is a rotating fluorescent material wheel comprising the fluorescent material on both sides thereof.

3. The illuminating optical system according to claim 2, further comprising a motor that rotates said fluorescent material wheel.

4. The illuminating optical system according to claim 2, further comprising a pinwheel that rotates as said fluorescent material wheel rotates.

5. The illuminating optical system according to claim 1, wherein said fluorescence supporting body is a fluorescent material bar comprising the fluorescent material on both sides thereof, and
   the illuminating optical system comprises a reciprocating motion mechanism that causes said fluorescent bar to perform reciprocating motion.

6. The illuminating optical system according to claim 1, wherein said fluorescence supporting body is a fluorescent material bar comprising the fluorescent material on both sides thereof, and
   said laser light sources are arranged in an array form in correspondence with a plurality of regions of the fluorescent material.

7. The illuminating optical system according to claim 1, wherein said fluorescence supporting body is a fluorescent material bar comprising the fluorescent material on both sides thereof,
   the illuminating optical system comprises a scanning system that is disposed in correspondence with said laser light sources and changes the orientation of excitation light emitted from said corresponding laser light sources and radiates the excitation light onto the fluorescent material.

8. The illuminating optical system according to claim 1, wherein the fluorescent material is a red color fluorescent material that generates red color fluorescence, a green color fluorescent material that generates green color fluorescence and a blue color fluorescent material that generates blue color fluorescence.

9. The illuminating optical system according to claim 2, wherein the fluorescent material is a red color fluorescent material that generates red color fluorescence, a green color fluorescent material that generates green color fluorescence and a blue color fluorescent material that generates blue color fluorescence.

10. The illuminating optical system according to claim 3, wherein the fluorescent material is a red color fluorescent material that generates red color fluorescence, a green color fluorescent material that generates green color fluorescence and a blue color fluorescent material that generates blue color fluorescence.

11. The illuminating optical system according to claim 1, wherein the fluorescent material is a white color fluorescent material that generates white color fluorescence.

12. The illuminating optical system according to claim 2, wherein the fluorescent material is a white color fluorescent material that generates white color fluorescence.

13. The illuminating optical system according to claim 3, wherein the fluorescent material is a white color fluorescent material that generates white color fluorescence.

14. The illuminating optical system according to claim 1, wherein the fluorescent material is a single color fluorescent material that generates single color fluorescence.

15. The illuminating optical system according to claim 2, wherein the fluorescent material is a single color fluorescent material that generates single color fluorescence.

16. The illuminating optical system according to claim 3, wherein the fluorescent material is a single color fluorescent material that generates single color fluorescence.

17. A projector comprising the illuminating optical system according to claim 1.

18. A projector comprising the illuminating optical system according to claim 2.

19. A projector comprising the illuminating optical system according to claim 3.

* * * * *